(No Model.)
H. BALDRIDGE.
TRANSPLANTER.
No. 485,832. Patented Nov. 8, 1892.
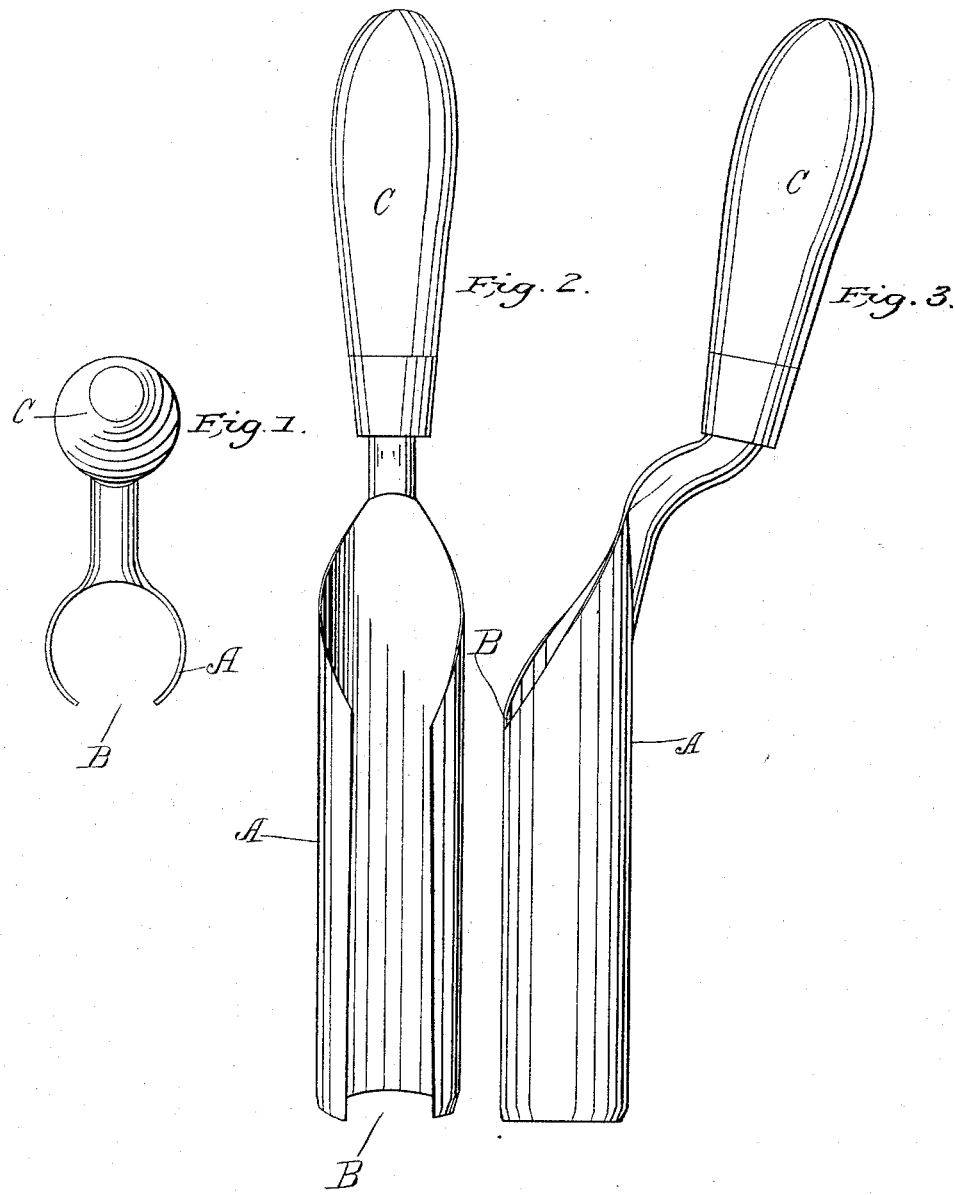
Witnesses.
P. W. Harbeson.
F. W. Townsend.
Inventor.
Herman Baldridge
by
Hazard & Townsend
his Att'y.

UNITED STATES PATENT OFFICE.

HERMAN BALDRIDGE, OF HIGHLANDS, CALIFORNIA.

TRANSPLANTER.

SPECIFICATION forming part of Letters Patent No. 485,832, dated November 8, 1892.

Application filed January 2, 1892. Serial No. 416,883. (No model.)

*To all whom it may concern:*

Be it known that I, HERMAN BALDRIDGE, a citizen of the United States, residing at Highlands, (San Bernardino P. O.,) in the county of San Bernardino and State of California, have invented a new and useful Improvement in Transplanters, of which the following is a specification.

My invention relates to devices for transplanting trees, vegetables, and plants of all kinds.

The purpose of my invention is to increase the convenience and expedition of the operation of transplanting.

My improvement relates to the removal from the earth of the plant to be transplanted, and also relates to the preparation of a place to receive the plant where it is to be transplanted.

My invention comprises improvements in transplanters adapted to remove a plug of earth with the plant to be transplanted.

The object of my invention is to produce a superior implement of this class by which a plant can be more more expeditiously removed from the earth accompanied by a solid plug of earth of sufficient size to contain all the roots necessary for the thrifty growth of the plant, such instrument being adapted for the formation of a more suitable hole in the earth for the reception of the plug of earth containing the plant, the implement also being so constructed and arranged that it is especially adapted for the ready and convenient removal from the implement of the plant and plug of earth when it is desired to deposit the same in the hole prepared for it, and also especially adapted for the instantaneous and convenient removal from the instrument (by centrifugal force) of the plug of earth withdrawn from the earth in making the hole to receive the plant.

The accompanying drawings illustrate my invention.

Figure 1 is a top or plan view. Fig. 2 is a plane elevation, looking into the tree-receiving slot or space between the edges of the blade; and Fig. 3 is a plane side elevation—*i. e.,* at right angles to the view in Fig. 2.

My improved transplanter consists in the combination shown—a rigid cylindrical longitudinally-slotted tubular blade A, having an interior diameter substantially the same throughout its entire length from top to bottom and having its lower end beveled peripherally to form a circular cutting-edge $b$ at the interior concave face of the blade and provided with a suitable crank-handle C, secured to the outside of the blade and projecting outward clear of the extended cylinder of the blade to form a convenient crank-handle wholly exterior to the tube for the rotation of the blade while in the earth about the tree or plant to cause the parallel edges $c$ of the blade (at the sides of the slot) to divide the earth and roots remaining within the space between such parallel edges when the instrument is inserted in the earth.

In practice the blade is first inserted its full depth into the earth at the point where it is desired to plant the tree, &c., and is then partially rotated (using the handle in the manner of a crank for this purpose) to cause the parallel edges to sever from the surrounding earth the plug of earth contained within the tubular blade. Then the tool, with its contained plug of earth, is lifted from the earth, thus leaving a suitable hole into which to insert the tree or other object to be transplanted. Then with a swing of the tool the operator frees it by centripetal force from the contained plug of earth. This is made possible by the novel construction of the blade—that is to say, the interior of the blade being circular and of the same diameter from the edge at its lower end to the top of the blade, the earth plug fits snugly within the blade and is held firmly enough by its own friction to allow the plug to be withdrawn from the earth, and yet is not held so firmly but that the rapid swing and quick jerk that can be given to the instrument by the operator will release the plug from the blade. The hole in the earth formed by the removal of the plug of earth is larger by only twice the thickness of the blade than the plug removed, so that the instrument filled with the plug of earth containing the plant can be inserted thereinto. The operator then encircles with the blade of the tool the stem of the tree, plant, &c., to be transplanted, passing the stem of the tree, &c., through the slot B for the purpose, and then forces the blade into the earth and rotates the tool, as before, to sever from the surrounding earth the earth contained within the tubular blade. Then the tool, with the contained plug of earth and the tree, plant, &c., is removed from the hole, and the tool is then inserted into the hole from which the earth was removed in the first-described operation. When fully inserted, the thumb of the operator is placed upon the plug above the slot and held there while the tool is withdrawn from the earth, leaving therein the tree, plant, &c., with its encircling plug of earth. The slot allows the thumb to remain in position upon the plug of earth while the blade is being withdrawn.

Now, having described my invention, what I claim as new, and desire to secure by Letters Patent, is—

The improved transplanter consisting of a rigid cylindrical longitudinally-slotted tubular blade having an interior diameter substantially the same throughout its length and having its lower end provided with a circular cutting-edge at the interior concave face of the blade and provided with a suitable crank-handle secured to said blade and projecting outward clear of the extended top of the cylinder, substantially as described.

HERMAN BALDRIDGE.

Witnesses:
JAMES R. TOWNSEND,
JAMES H. BOYD,
C. D. DICKEY.